No. 679,634. Patented July 30, 1901.
W. McKNIGHT.
SAW TOOTH GAGE.
(Application filed Jan. 9, 1901.)

(No Model.)

WITNESSES:

INVENTOR
William McKnight
BY
ATTORNEYS

UNITED STATES PATENT OFFICE.

WILLIAM McKNIGHT, OF EBENSBURG, PENNSYLVANIA.

SAW-TOOTH GAGE.

SPECIFICATION forming part of Letters Patent No. 679,634, dated July 30, 1901.

Application filed January 9, 1901. Serial No. 42,629. (No model.)

*To all whom it may concern:*

Be it known that I, WILLIAM McKNIGHT, a citizen of the United States, and a resident of Ebensburg, in the county of Cambria and State of Pennsylvania, have invented a new and Improved Saw-Tooth Gage, of which the following is a full, clear, and exact description.

This invention relates to improvements in circular-saw-tooth gages; and the object is to provide a simple device designed to be engaged with the saw-teeth, whereby the teeth may be filed perfectly square or flat on the back, front, and point and whereby the length of the teeth may be equalized and the saw kept round, thus resulting in better and faster work from the saw.

I will describe a saw-tooth gage embodying my invention and then point out the novel features in the appended claims.

Reference is to be had to the accompanying drawings, forming a part of this specification, in which similar characters of reference indicate corresponding parts in all the figures.

Figure 1:
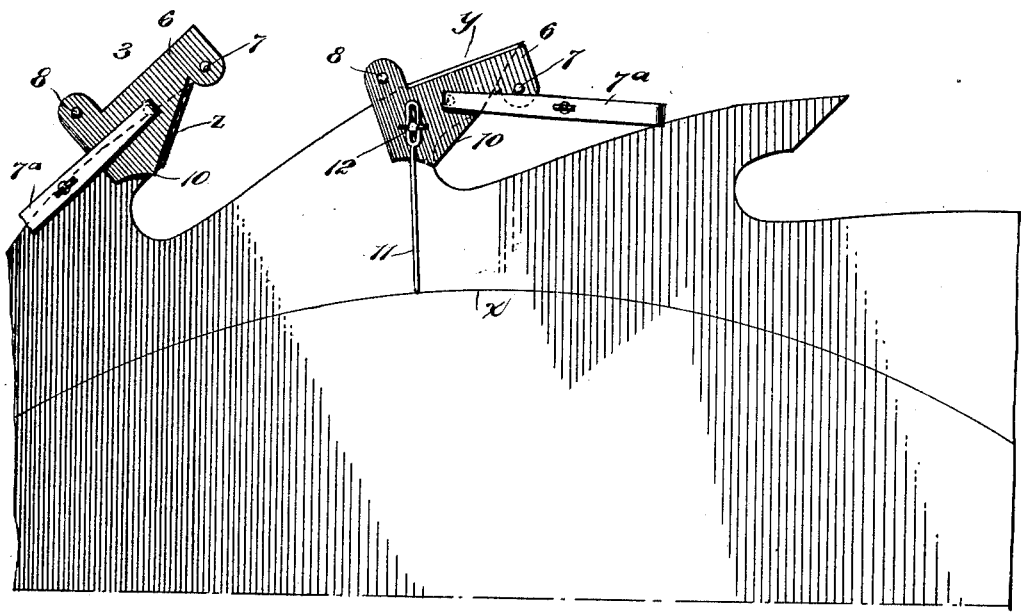
Figure 2:
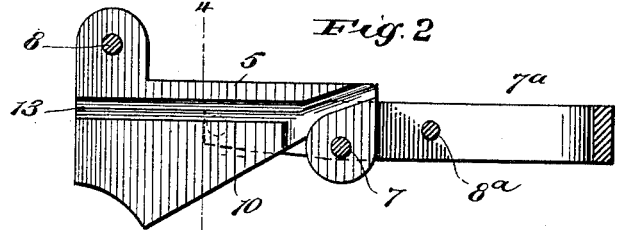
Figure 3:
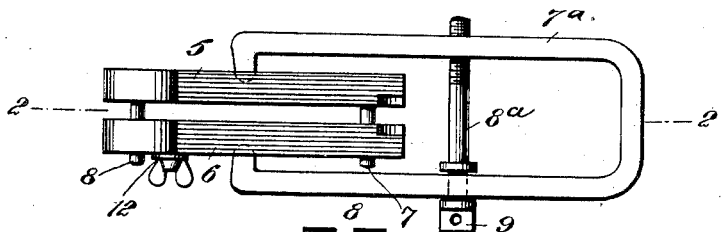
Figure 4:
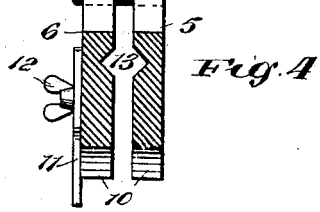

Figure 1 is a side view of a portion of a saw, showing a gage embodying my invention connected thereto, the same being indicated in its two positions. Fig. 2 is a section on the line 2 2 of Fig. 3. Fig. 3 is a top view, and Fig. 4 is a section on the line 4 4 of Fig. 2.

The gage consists of two side plates 5 and 6, consisting of metal of sufficient hardness to resist a file, which are attached one with the other at the ends by pins 7 8. These pins are to be sufficiently loose, at least in one of the side pieces, to permit the said side pieces to be moved toward each other to clamp closely against the sides of the saw-teeth. The clamp consists of a substantially U-shaped bar 7$^a$, of spring material, having its free ends toward each other and engaging in depressions in the outer surfaces of the side plates, and a clamping-screw 8$^a$ engages with the two members of the clamp. This screw may be turned by means of a suitable tool inserted through an opening in the head 9 of the screw. The lower side edges of the plates 5 and 6 are inclined, as at 10, to correspond substantially to the incline of the forward ends of the saw-teeth, while the upper edges are made straight to correspond to the straight backs of the teeth. Adjustable on one of the plates is a gage-finger 11, consisting of wire, having a slot at one end through which a set or thumb screw passes.

In filing and truing a saw with my invention the operation is as follows: First, while the saw is in rotation a piece of chalk is to be held at the side thereof near the points of the teeth. The line made by this piece of chalk will indicate the shortest tooth of the saw. Then by a suitable tool—such, for instance, as the tang of a file—a circular mark is to be made around the saw, as indicated at $x$. The gage is to be clamped on the shortest tooth and then the gage-finger 11 lowered until its end coincides with the mark $x$ and the finger held in this position by the set-nut. Then the gage is to be removed to the next tooth with the end of the finger 11 on the line $x$, as indicated at $y$ in Fig. 1. The back of the tooth is now to be filed down even with the top edges of the side pieces, and at this time the clamp 7$^a$ will rest with its end upon the next forward tooth. At $z$ the gage is shown in position to permit the filing of the front inclined edge of the tooth. At this time the clamp 7$^a$ will be turned back to engage upon the outer surface of the tooth, as shown at the left in Fig. 1. This operation is to be continued with each tooth until all of the teeth shall have been filed to correspond in length to that of the shortest tooth found. The inner surfaces of the side pieces are provided with channels 13 to receive the set or nibs at the ends of the teeth when teeth are provided with such nibs.

Having thus described my invention, I claim as new and desire to secure by Letters Patent—

1. A saw-tooth gage, comprising side plates shaped at their upper and lower edges to conform to the back and front edges of a saw-tooth, means for clamping the plates on a tooth, the said plates being channeled at their inner sides, and a gage-arm adjustable on one of the plates, substantially as specified.

2. A saw-tooth gage, comprising two plates, pins connecting the ends of said plates, a clamp mounted to swing forward and rearward of the plates, and a gage-finger on one of the plates and adapted to be set to a line marked on a saw, substantially as specified.

In testimony whereof I have signed my name to this specification in the presence of two subscribing witnesses.

WILLIAM McKNIGHT.

Witnesses:
F. C. SHARBAUGH,
H. H. MYERS.